United States Patent
Kobayashi et al.

(10) Patent No.: US 7,219,151 B2
(45) Date of Patent: May 15, 2007

(54) COMPUTER SYSTEM THAT ENABLES A PLURALITY OF COMPUTERS TO SHARE A STORAGE DEVICE

(75) Inventors: Ikuko Kobayashi, Kawasaki (JP); Shinji Kimura, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 373 days.

(21) Appl. No.: 10/751,934

(22) Filed: Jan. 7, 2004

(65) Prior Publication Data
US 2005/0091333 A1 Apr. 28, 2005

(30) Foreign Application Priority Data
Oct. 23, 2003 (JP) .............................. 2003-362748

(51) Int. Cl.
G06F 15/16 (2006.01)
G06F 15/173 (2006.01)
(52) U.S. Cl. ................. 709/225; 709/225; 709/223; 709/227
(58) Field of Classification Search ............... 709/227, 709/230, 250, 253, 223–226, 238, 203, 249; 710/305; 370/466; 713/165; 711/141, 147
See application file for complete search history.

(56) References Cited

U.S. PATENT DOCUMENTS

| | | | |
|---|---|---|---|
| 4,780,821 A | 10/1988 | Crossley | |
| 6,304,907 B1 | 10/2001 | Keronen et al. | |
| 6,779,083 B2 | 8/2004 | Ito et al. | |
| 6,807,581 B1 * | 10/2004 | Starr et al. | 709/250 |
| 6,895,461 B1 * | 5/2005 | Thompson | 710/305 |
| 6,931,530 B2 * | 8/2005 | Pham et al. | 713/165 |
| 7,072,986 B2 * | 7/2006 | Kitamura et al. | 709/249 |
| 2001/0020254 A1 | 9/2001 | Blumenau et al. | |
| 2001/0044893 A1 | 11/2001 | Skemer | |
| 2003/0177174 A1 * | 9/2003 | Allen et al. | 709/203 |
| 2003/0236897 A1 | 12/2003 | Shitano et al. | |
| 2004/0139167 A1 | 7/2004 | Edsall et al. | |
| 2004/0172558 A1 | 9/2004 | Callahan et al. | |
| 2005/0044199 A1 * | 2/2005 | Shiga et al. | 709/223 |

OTHER PUBLICATIONS

Cisco SN 5428 Storage Router Software Configuration Guide 78-15336-01, Chapter 1 Before Configuring SN 5428 Storage Router Software (1-1 to 1-22).

* cited by examiner

*Primary Examiner*—David Wiley
*Assistant Examiner*—David E. England
(74) *Attorney, Agent, or Firm*—Mattingly, Stanger, Malur & Brundidge, P.C.

(57) ABSTRACT

A computer system, method and apparatus includes: centrally managing user identification names and passwords that are assigned to users, target names of storage devices, addresses, and logical units; acquiring target names of storage devices and logical unit names from the user identification names and passwords obtaining the addresses of the storage devices from the user identification names, passwords, and target names; and dynamically creating access control information of the logical units for each session in an iSCSI session establishment processing. The system, method and apparatus enable sharing of storage devices so as to enable users to use logical units assigned to the users in any computers in a system using storage devices complying with the iSCSI protocol, connected to networks, such as IP networks, through node devices, such as cache devices and gateway devices.

1 Claim, 9 Drawing Sheets

USER MANAGEMENT INFORMATION 131

| USER IDENTIFICATION NAME | PASSWORD | TARGET NAME | LUN |
|---|---|---|---|
| kobayashi | XXX | Target-A | LUN-1 |
| kimura | XXXX | Target-B | LUN-1 |

TARGET MANAGEMENT INFORMATION 132

| TARGET NAME | TARGET ADDRESS |
|---|---|
| Target-A | IP-A |
| | |

FIG. 7B
login PROCESSING

→ iSCSI AUTHENTICATION (181) → DECIDE TARGET ADDRESS AND LUN (182) → EXECUTE login FOR TARGET (183) → CREATE ACCESS CONTROL INFORMATION (184) →

FIG. 7A
SendTargets PROCESSING

→ iSCSI AUTHENTICATION (171) → SELECT TARGET NAME (172) → SEND TARGET NAME AND TARGET ADDRESS (173) →

USER MANAGEMENT INFORMATION 131

| USER IDENTIFICATION NAME | PUSSWORD | TARGET NAME | MAIN LUN | BACKUP LUN |
|---|---|---|---|---|
| kobayashi | XXX | Target-X | LUN-1 | LUN-1 |
| kimura | XXXX | Target-Y | LUN-1 | LUN-2 |

132

| TARGET NAME | MAIN TARGET | | BACKUP TARGET | | OPERATING TARGET |
|---|---|---|---|---|---|
| | NAME | ADDRESS | NAME | ADDRESS | |
| Target-X | Target-A | IP-A | Target-B | IP-B | MAIN |

FIG. 10

COMPUTER SYSTEM THAT ENABLES A PLURALITY OF COMPUTERS TO SHARE A STORAGE DEVICE

BACKGROUND OF THE INVENTION

Field of the Invention

The present invention relates to technology for sharing storage devices among a plurality of computers. More particularly, the present invention relates to technology for assuring the security of a system by the authentication of users when a plurality of computers use storage devices.

In recent years, the iSCSI standards are being established as technology for using storage devices through networks.

iSCSI (Internet SCSI) is protocol standards for sending and receiving SCSI (Small Computer System Interface) commands and data that have been conventionally used for data communication between computers and storage devices through networks using IP protocol for the Internet. With iSCSI, a computer issuing commands is referred to as an initiator, and a storage device receiving the initiator commands is referred to as a target. An initiator and a target are provided with an identifier called an initiator name and a target name, respectively. An initiator uses TCP, which is a protocol for IP networks, to establish a session with a target, and sends and receives request/reply commands according to the SCSI protocol.

As an apparatus for bringing storage devices (hereinafter referred to as FC storages) having interfaces such as conventional fiber channels into line with the standards of the aforementioned iSCSI, there is a storage router disclosed in Cisco SN5428 Storage Router Software Configuration Guide: "Before Setting the SN5428 Storage Router software".

In a computer using the storage router, an IP address assigned to the storage router, and the user names (hereinafter referred to as user names for iSCSI authentication) and passwords for iSCSI authentication are stored in a setting file (hereinafter referred to as a configuration file) owned by the computer. An iSCSI initiator name assigned to the computer is stored in an iSCSI name file owned by the same computer. When communicating with an FC storage, after establishing a TCP connection with a storage router specified in the configuration file, the computer passes the user name and password for iSCSI authentication and an iSCSI initiator name to the storage router to perform iSCSI session establishment processing.

In order to perform access control so that a logical storage area (hereinafter referred to as a logical unit) of an FC storage, assigned to a computer, is not used by other computers, access control information (access list) using information for identifying computers (one of IP addresses, iSCSI initiator names, and user names for iSCSI authentication) is registered in the storage router. The access list contains the following information items associated with one another: information for identifying computers, iSCSI target names assigned to the storage router, the logical unit numbers (LUN) of iSCSI, target addresses assigned to computer-usable FC storages, and LUNs of computer-usable FC storages.

When an iSCSI session is established, the storage router, only for a computer defined in the access list, approves the use of an FC storage usable to the computer or a logical unit of the FC storage, and specifically transfers commands to the FC storage from the computer.

SUMMARY OF THE INVENTION

The following discussion assumes the creation of a system in which storage devices collectively managed and operated by a data center are used by a plurality of users such as enterprises through public networks such as global IP networks, or logical units of storage devices owned by an enterprise are assigned to employees of the enterprise and the employees use the assigned logical units from any computers connected to any networks.

In this case, apparatuses (hereinafter referred to as node devices) such as cache devices and gateway devices are often placed between the computers and the storage devices for the purposes of reduction in the access load on the storage devices and the elimination of delays.

Conventional methods have problems described below, when a system is assumed in which logical units of storage devices assigned in units of users (enterprises, employees of the enterprises and the like) are used in any computers connected to any networks via the aforementioned node devices.

Conventionally, access control has been performed using information identifying computers by storage devices or routers and the like connected the storage devices, like the aforementioned storage router. In the case where a node device is placed, since identification information of a computer used by a user is not sent to the storage devices (information identifying the node device is sent to the storage devices), the storage devices and the routers cannot perform access control, using the identification information of the computer used by the user.

Conventionally, access control information for each computer has been statically created and registered in storage devices or routers. The word "statically" indicates that once information has been set, it is not changed unless it is changed by the administrator and the like. Therefore, in the case where a user uses a computer in unspecific places, in order that storage devices can be used whatever node devices intervene, the computer used by the user must be registered in all node devices existing in networks, making management difficult.

Furthermore, conventionally the addresses of storage devices used (approved for use) by computers have been statically set on the side of the computers. Accordingly, if a computer used by a user is changed, storage devices connectable to a new computer may change, with the result that the user may not use identical storage devices (or logical units of the storage devices) by use of a given computer.

Furthermore, in the case of a system duplicating data by use of a plurality of storage devices, users must use an operating storage device (in service) of the plurality of storage devices. Conventionally, in order to change storage devices used by a computer, it has been necessary to change the address setting of the storage devices registered in the computer before restarting the computer. This has been a cumbersome task.

An object of the present invention is to provide a method and apparatuses for sharing storage devices so as to enable users to use logical units assigned to the users in any computers in a system using the storage devices complying with the iSCSI protocol, connected to networks (particularly IP networks) through node devices such as cache devices and gateway devices.

A computer system of the present invention includes a computer, a first network connected with the computer, a node device connected with the first network, a second network connected with the node device, and a storage device connected with the second network. When a user of the computer uses the storage device through the node device, the node device receives an identifier assigned to the user from the computer through the first network and sends information about a storage device corresponding to the identifier to the computer, and the computer uses the storage device on the basis of the information about the storage device.

As a further embodiment of the present invention, the computer system further includes a second computer connected to the second network, and the second computer has information indicating the relationship between identifiers and the information about the storage device. When receiving an identifier from a computer, the node device acquires information about the storage device from the second computer. The information indicating the aforementioned relationship may be stored in advance in the node device.

As a further embodiment, packet transmission based on an iSCSI protocol may be performed among the computer, the node device, and the storage device.

Furthermore, when the computer and the storage device establish a session by use of the information about the storage device, the node device may create information about the session and may store it in a storage unit owned by the node device. Furthermore, the node device may delete the information about the session from the storage unit when the session terminates.

DETAILED DESCRIPTION OF THE PREFERRED EMBODIMENT

Hereinafter, the present invention will be described with reference to the accompanying drawings and the like. Referring to FIGS. 1 to 7, a description will be made of a first embodiment of the present invention. It goes without saying that the present invention is not limited to embodiments described below.

Figure 1:
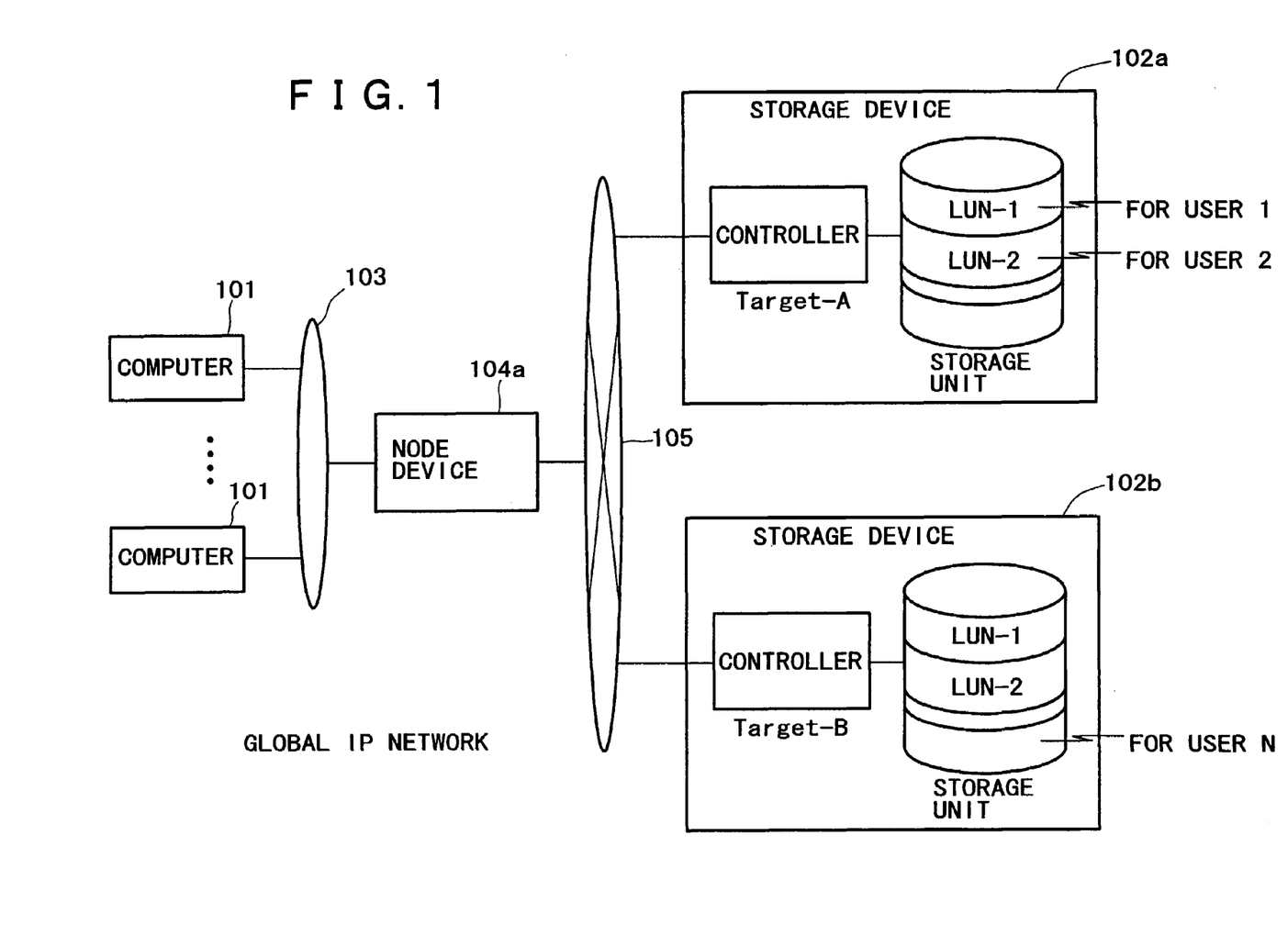
FIG. 1 is a drawing showing a sample configuration of a system in a first embodiment.

FIG. 1 is a drawing showing a sample configuration of a computer system to which the first embodiment is applied. The computer system includes computers 101, storage devices 102, a node device 104, and IP networks 103 and 105 that mutually connect them. Here, the IP networks refer to communication networks using internet protocols; their physical components (copper wire, optical fiber and the like) are not limited. IP networks 103 and 105 may be the same or different in configuration.

The computers 101 are used by users. Drivers and the like (hereinafter referred to as iSCSI drivers) that can process iSCSI protocols (particularly iSCSI initiator protocols) are incorporated in an operating system (hereinafter referred to as OS) executed by the computers 101. The drivers are realized by programs, dedicated hardware, or combinations of them.

The storage device 102 can process iSCSI protocol (particularly iSCSI target protocol). The storage device referred to here is an apparatus that has a storage unit such as a disk having storage areas for storing data, and a controller for controlling the storage unit. A concrete example of the storage device 102 is a RAID apparatus having a plurality of disks.

The storage device 102, to accommodate iSCSI protocols, has an apparatus (storage router) that transforms the iSCSI protocols into protocols such as fiber channels used in the controller and storage unit of the storage device. In this case, the controllers of the storage devices 102 are connected with the storage router through fiber channels. In this case, the storage router is connected with the IP network 105, and commands received from the IP network 105 are transformed to fiber channel protocols by the storage router and sent to the controllers.

In the storage devices 102, the storage router and the controllers may be unified so that the controllers are connected directly to the IP network 105 to transform iSCSI protocols.

The node device 104 is an apparatus that operates as a target according to iSCSI protocols. The node device 104 also operates as the gateway that mutually connects the IP networks 103 and 105. The node device 104 authenticates the users who are to use the storage devices 102, selects the storage devices 102 used by the users, connects communication with the storage devices 102, and creates access control information.

In the present embodiment, the storage devices 102 are managed in a data center and enterprises use the storage devices 102 via the IP network 105. One or more node devices 104 are assigned to the enterprises. In this case, one enterprise may have a plurality of service points, each with a node device 104 (e.g., 104a or 104b) disposed, or a plurality of enterprises may share one node device 104. Or, the node device 104 may be on a public network to receive all accesses from the users who use the storage devices 102. The node device 104 connects with a plurality of computers 101 through the IP network 103.

The computers 101 connected to one node device 104 are, in the case where the node device 104 is exclusively used by one enterprise, used by employees of the enterprise. In the case where the node device 104 is shared by a plurality of enterprises, and in the case where the node device 104 is on a public network, the computers 101 are used by a plurality of users.

Furthermore, users such as enterprises or employees who belong to the enterprises are assigned logical units (hereinafter referred to as LU) of the storage devices 102 (permitted to use) usable to the users, and a user name and a password are assigned to each of the users. The users use any computers 101 inside and outside the enterprises, for example, computers 101 at a plurality of service points. A logical unit indicates one unit of logical storage areas formed in the storage devices 102.

Hereinafter, a processing procedure in the computer system will be outlined.

When a user starts the computer 101, an OS executed by the computer 101 registers a device (one of the LUs of the storage device 102) used by the computer 101 in a device file owned by the computer 101. The LU registered in the device file becomes a device usable to the OS and a file system.

The present embodiment assumes that devices used by the computer 101 are devices complying with iSCSI protocols (hereinafter referred to as SCSI devices). Therefore, the OS requests the iSCSI driver of the computer 101 to make preparations for the mounting of the storage device 102, that is, acquire the information of an SCSI device (specifically LU) to be registered in the device file. Upon receiving the request, the iSCSI driver requests the input of a user name and password from the user through the OS. The user inputs a user name and password, and the driver registers the information (user name, etc.) in the computer 101.

The computer 101 uses the iSCSI driver to send the user name and password to the node device 104 as the user name and password for iSCSI authentication through the IP network 103. Upon receiving the user name and password for iSCSI authentication, the node device 104 sends the iSCSI target name and target address assigned to the storage device 102 in which the LU assigned to the user specified by the received information exists to the computer 101. In this way, the computer 101 obtains the iSCSI target name and target address in which the SCSI device (LU) assigned to the user exists (Send Targets processing).

Then, the computer 101 establishes a session with the node device 104 (login processing).

The node device 104 establishes a session with the storage device 102 that the user is to use (login processing). The node device 104 itself creates access control information between the computer 101 and the storage device 102. The access control information will be described later. After the session establishment, the computer 101 and the storage device 102 send and receive SCSI commands through the node device 104. The computer 101 acquires the information of LU assigned to the user from the storage device 102 via the node device 104, and registers the LU in the device file as an SCSI device used by the computer 101.

The user mounts the SCSI device (one of LUs of the storage device 102) thus registered in the file system. As a result, the user to use the file system is permitted to use the LU of the storage device 102.

When the user later dismounts the SCSI device from the file system, the computer 101 and the storage device 102 terminates the session, and the node device 104 deletes the access control information created by itself.

Hereinafter, the apparatus configuration, module configuration, and management information of the node device 104 will be described in detail.

Figure 2:
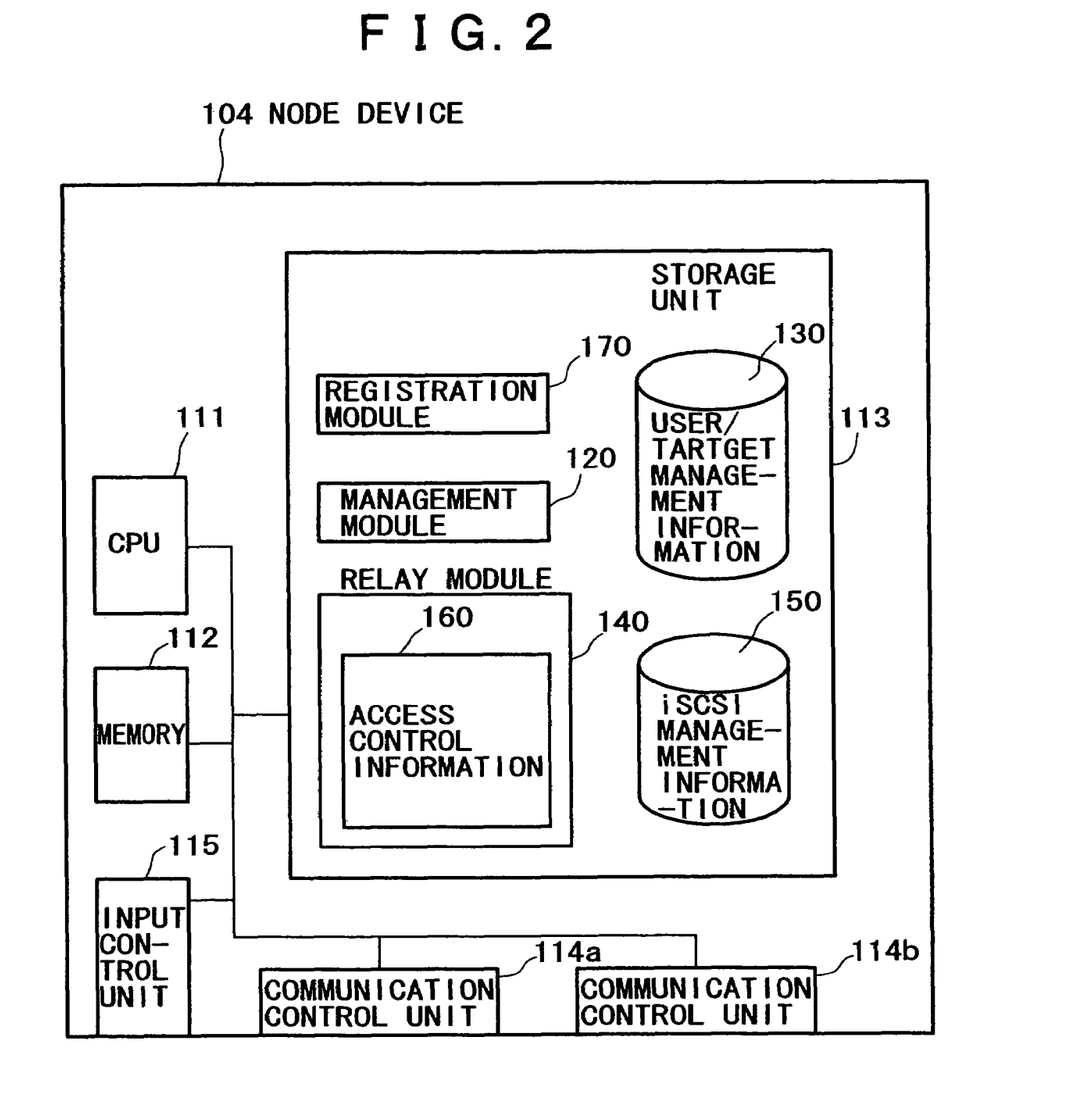
FIG. 2 is a drawing showing a sample configuration of a node device.

FIG. 2 is a drawing showing a sample configuration of the node device 104. The node device 104 is a computer that has a CPU 111, a main memory 112, a storage unit 113, a communication control unit 114, an input control unit 115, and the like. The communication control units 114a and 114b are connected to the IP networks 103 and 106, respectively.

The storage unit 113 of the node device 104 stores a relay module 140, iSCSI management information 150, a registration module 170, a management module 120, and user/target management information 130.

The relay module 140 is a program that is read into the main memory 112 and executed by the CPU 111. By the relay module 140, received commands are relayed in the node device 104. The relay module 140 may be realized by dedicated hardware, not by a program.

The relay module 140 uses OS-offered TCP/IP network communication interfaces and the communication control units 114 to communicate with other computers and other apparatuses.

The iSCSI management information 150 is data read into the main memory 112 for use when the relay module 140 is started. The iSCSI management information 150 contains iSCSI initiator names, and the user names and passwords for iSCSI authentication that are assigned to the node device 104.

The registration module 170 and the management module 120 are programs that are read into the main memory 112 and executed by the CPU 111. By these programs, the users and LUNs of the storage devices 102 is managed. The registration module 170 and the management module 120 may be realized by dedicated hardware, not by programs.

The user/target management information 130 is data read into the main memory 112 for use by the management module 120. It is stored in the storage unit 113 at the time of the program termination of the management module 120.

Figure 3:
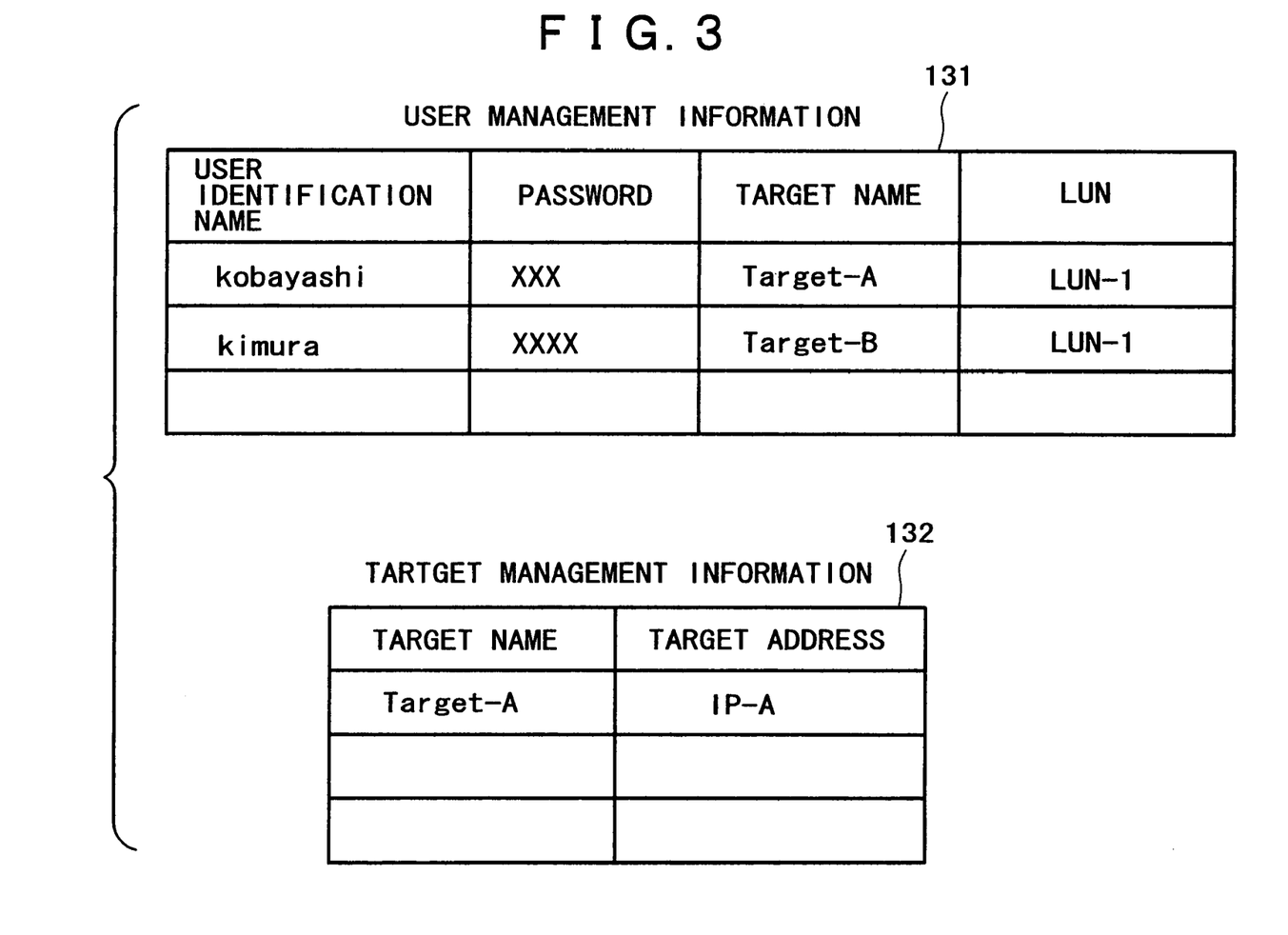
FIG. 3 is drawing showing a sample configuration of a user/target management information.

FIG. 3 is a drawing showing a sample configuration of the user/target management information 130. The user/target management information 130 includes user management information 131 and target management information 132. The user management information 131 contains the information of the correspondence relationship among the user names and passwords that are assigned to users, the iSCSI target names of the storage devices 102 assigned to the users, and LUNs assigned to the users. The target management information 132 contains the information of the correspondence relationship between iSCSI target names and target addresses (IP addresses) of the storage devices 102.

Figure 4:
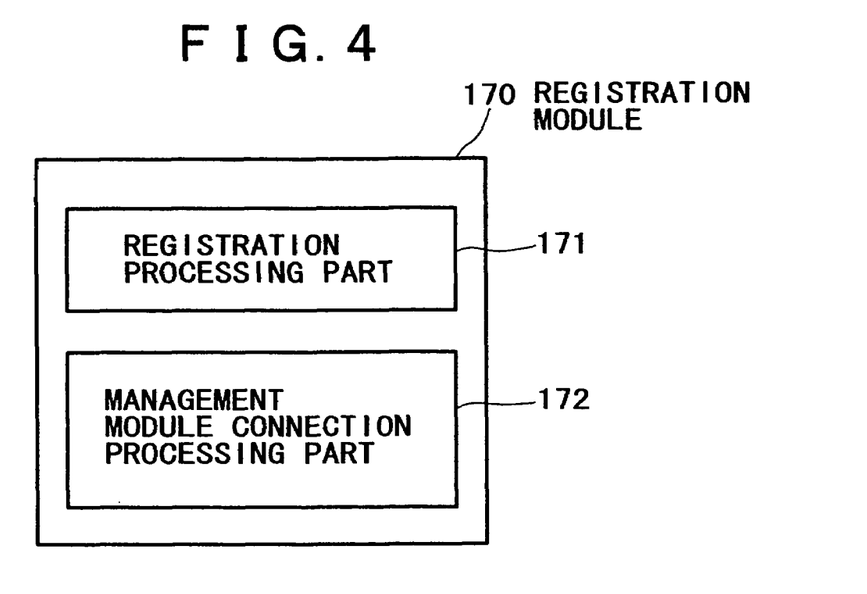
FIG. 4 is a drawing showing a sample configuration of a registration module.
Figure 5:
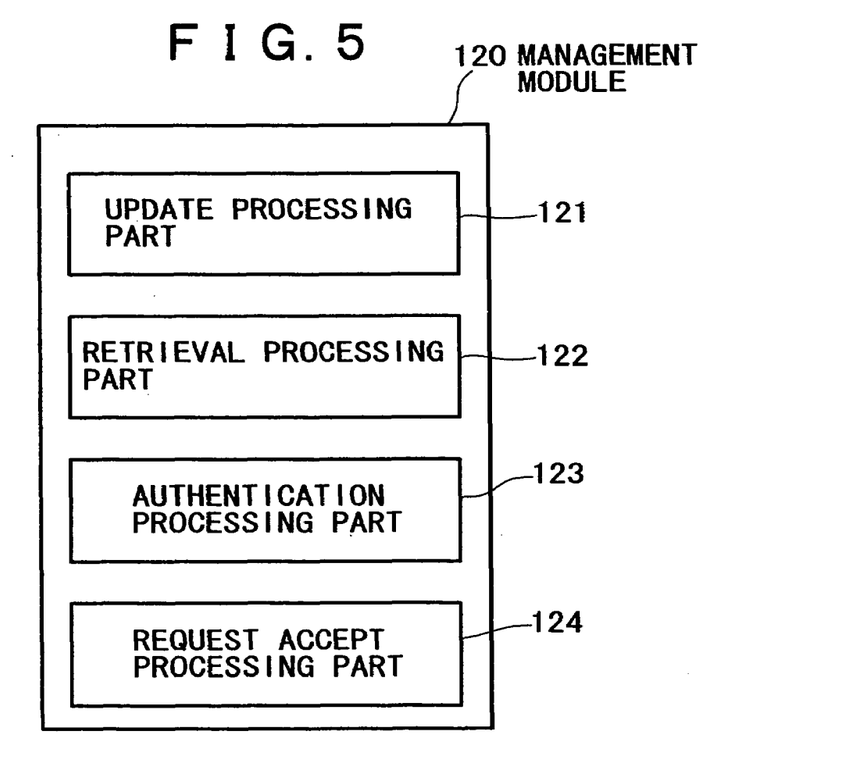
FIG. 5 is a drawing showing a sample configuration of a management module.

FIGS. 4 and 5 are drawings showing detailed sample configurations of the registration module 170 and the management module 120. Parts described below are realized by programs if the registration module 170 and the management module 120 (the relay module 140) are programs. If the registration module 170 and the management module 120 (or relay module 140) are dedicated hardware, the parts are realized by the hardware or programs executed by the dedicated hardware. In the case where the parts and the modules are subjects, if they are realized by programs, actually the CPU 111 executing the programs perform processing.

The registration module 170 includes a registration processing part 171 and a connection processing part 172. The registration processing part 171 updates the user/target management information 130. The connection processing part 172 sends and receives an update request and an update reply to and from management module 120.

The management module 120 includes an update processing part 121, a retrieval processing part 122, an authentication processing part 123, and a request accept processing part 124. The update processing part 121 registers, deletes, and updates the user management information 131 and the target management information 132. The retrieval processing part 122 retrieves the user management information 131 and the target management information 132. The authentication processing part 123 retrieves the user management information 131 to authenticate the user. The request accept processing part 124 receives an update request, a retrieval request, and an authentication request of the user/target management information 130 and sends an update reply, a retrieval reply, and an authentication reply.

Figure 6:
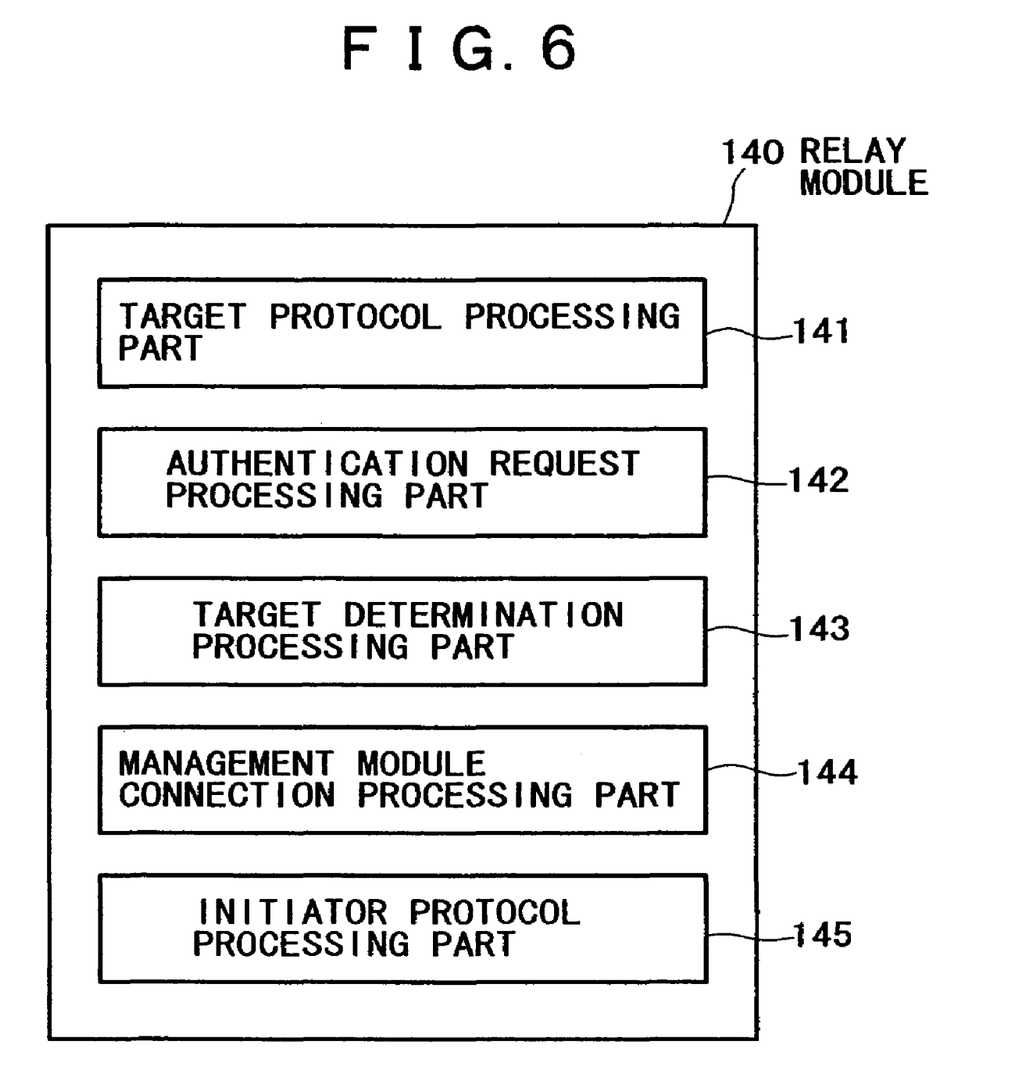
FIG. 6 is a drawing showing a sample configuration of a relay module.

FIG. 6 is a drawing showing a detailed sample configuration of the relay module 140. The relay module 140 includes a target protocol processing part 141, an authentication processing part 142, a target determination processing part 143, a connection processing part 144, and an initiator protocol processing part 145. The target protocol processing part 141 performs protocol processing for iSCSI targets and controls the communication control unit 114*a* to send and receive iSCSI protocol packets to and from the computer 101. The authentication processing part 142 sends an authentication request to the management module 120 to perform user authentication processing.

The target determination processing part 143 sends a target retrieval request to the management module 120 and acquires the iSCSI target name of a target. The connection processing part 144 sends and receives retrieval/authentication requests and retrieval/authentication replies to and from the management module 120. The connection processing part 144 is used by the authentication processing part 142 and the target determination processing part 143. The initiator protocol processing part 145 performs protocol processing for iSCSI initiators and uses the communication control unit 114*b* to send and receive iSCSI protocol packets to and from the storage device 102.

Hereinafter, the procedure for using the computer system of the present embodiment is described together with the operations of individual apparatuses.

A description is made of an advance preparation procedure before the use of the computer system, performed by a system administrator. Operations (1) and (2) below may be performed in any order.

(1) Activating the Node Device 104

The system administrator directs the processing of (a), (b), (c), and (d) below through an input control unit (e.g., console) that the node device 104 has.

(a) Assign IP addresses (IP-NAa, IP-NAb, etc.) to the communication control units 114*a* and 114*b* of the node device 104 and register them in accordance with the specifications of the OS of the node device 104.

(b) Register iSCSI initiator names, and the user names and passwords for iSCSI authentication that are assigned to the node device 104, in the iSCSI management information 150.

(c) Use the communication ports (Port-M) and IP address (IP-NAa) used by the request accept processing part 124 of the management module 120 as parameters and start the management module 120. After the start, the management module 120 reads the user/target management information 130 and performs data initialization. The request accept processing part 124 opens the communication port Port-M and makes preparations for receiving update, retrieval, and authentication requests.

(d) Use the communication port (Port-M) and IP address (IP-NAa) used by the management module 120 as parameters, and start the relay module 140 of the node device 104. After the start, the target protocol processing part 141 opens communication ports assigned to iSCSI targets and makes preparations for receiving iSCSI request packets.

The initiator protocol processing part 145 reads the iSCSI management information 150, and uses information registered in (b) to initialize the data of iSCSI initiator names, and the user names and passwords for iSCSI authentication of the node device 104. The connection processing part 144 opens the sending/receiving ports with the management module 130 and makes preparations for sending retrieval requests.

(2) Starting the Storage Device 102 and Creating Logical Units

The system administrator directs the processing of (a), (b), and (c) below through an input control unit (e.g., console) that the storage device 102 has.

Although the initialization of the storage device 102 is performed according to the specifications of the storage device 102, the present invention first performs settings described below.

(a) Start the storage device 102 according to the specifications of the storage device 102, assign IP addresses (here, IP-A, IP-B) and iSCSI target names (Target-A, Target-B) to each of the storage devices 102*a* and 102*b*, and register them according to the specifications of the apparatuses.

(b) Create LU(s) in the storage devices 102*a* and 102*b*, and present the LUNs (here, LUN-1, LUN-2, etc.) to each of them.

(c) Perform iSCSI authentication for access to the storage device 102*a* and LUNs, decide whether to perform access control, and register necessary information according to the specifications of the apparatus. In the case of performing iSCSI authentication, register the user names and passwords for iSCSI authentication of the node device 104 defined in (b) of (1), and the IP address of the node device 104 according to the specifications of the apparatus. In the case of performing access control, register the user names and passwords for iSCSI authentication of the node device 104 defined in (b) of (1), and LUNs accessible by the node device 104 according to the specifications of the apparatus. In the case of not performing access control, register information so as to enable access to all LUNs.

After the termination of the advance setting of the system, the system administrator performs user registration.

(3) User Registration

The system administrator assigns a unique user name and password to the user who is to use the storage device 102.

Thereafter, the system administrator inputs, through the console of the node device 104, the user name and the password, the LUN of LU assigned to the user, of LUs created in (b) of (2), and the iSCSI target name and target address of the storage device 102 in which the LUN exists, as parameters to the node device 104, and then starts the registration module 170. The registration module 170 sends an update request to the request accept processing part 124 of the management module 120.

The request accept processing part 124 passes the inputted data such as the user name, password, iSCSI target name, target address, the LUN of LU assigned to the user to the update processing part 121. The update processing part 121 registers them in the user/target management information 130. The system administrator terminates the registration module 170 after the termination of the registration.

Next, the system administrator performs the setting of the computer 101 used by the user. This processing can also be performed by the user.

(4) Setting of the Computer 101

The system administrator assigns an IP address to the computer 101 and registers it in the computer 101 according to the specifications of OS.

The system administrator stores the IP address (IP-NAa) of the node device 104 in the initialization file of the iSCSI driver. The system administrator incorporates the iSCSI driver into the OS executed in the computer 101. The iSCSI driver acquires computer identification information and the like from the OS, and creates and stores an iSCSI initiator name from them.

After making the above preparations, the user uses the storage device 102 through the computer 110. As mentioned above, the OS of the started computer 101 requests the iSCSI driver to make preparations for the mounting of the storage device 102. Hereinafter, a description is made of preparations for mounting the storage device by the iSCSI driver.

(5) Start Processing

The iSCSI driver requests the user to input a user name and a password. The user inputs a user name and a password. The inputted information is recorded in the initiator protocol processing part 145 of the iSCSI driver.

Figure 7A:
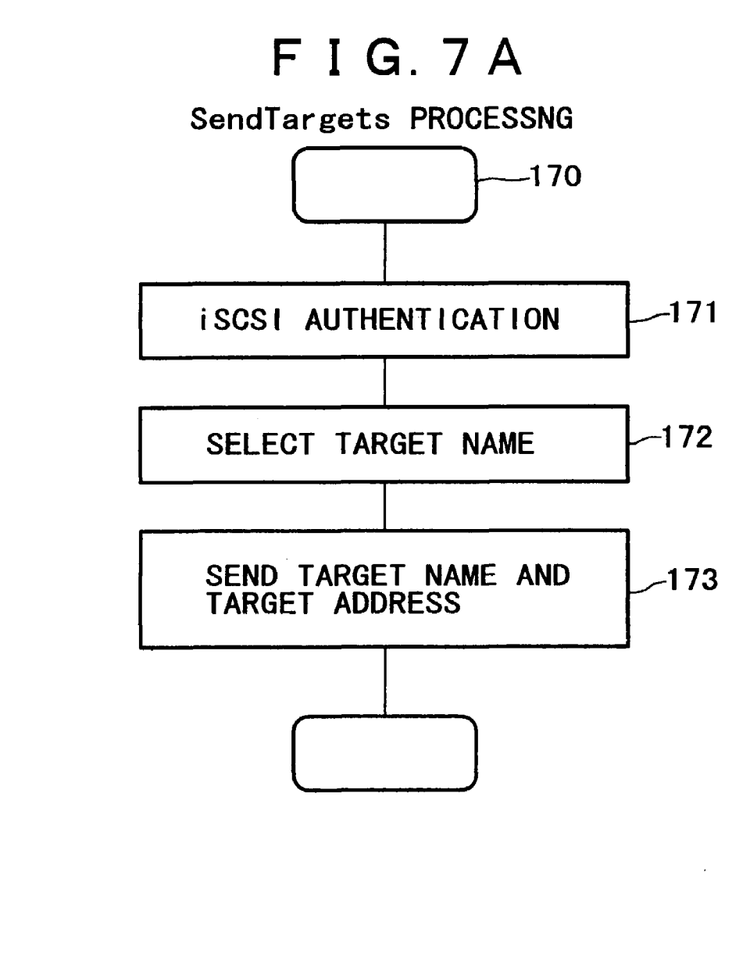
FIG. 7A is a flowchart showing the procedure for Send Target processing of the relay module.

(6) Send Targets Processing

FIG. 7A is a drawing showing the processing procedure of the aforementioned Send Targets processing. The iSCSI driver sends a target name inquiry request (hereinafter referred to as Send Targets request packet) to a target (the node device 104) set in the initialization file. The Send Targets request packet contains information such as an iSCSI initiator name indicating the computer 101 sending the packet, and a user name and password for iSCSI authentication. For a user name and password for iSCSI authentication, the user name and password acquired in (5) are used. The target protocol processing part 141 of the node device 104 receives the Send Targets request packet.

The target protocol processing part 141 calls the authentication request processing part 142 and performs iSCSI authentication processing. Specifically, the authentication request processing part 142 sends an authentication request including the received user name and password for iSCSI authentication to the authentication processing part 123 of the management module 120. The authentication processing part 123 of the management module 120 compares the received user name and password for iSCSI authentication with the information registered in the user management information 131 to perform user authentication. The authentication processing part 123 determines whether or not access is approved on the basis of the comparison result and sends the results to the authentication request processing part 142 as an authentication reply.

Upon receiving the authentication reply, the authentication request processing part 142 notifies the target protocol processing part 141 whether access is approved. If access is disapproved, the target protocol processing part 141 sets an access disapproval error in a Send Targets reply packet and sends the reply packet to the computer 101 (step 171).

On the other hand, if access is approved, the target protocol processing part 141 calls the target determination processing part 143 and performs target name selection processing. The target determination processing part 143 sends a target name retrieval request including the received user name and password for iSCSI authentication to the retrieval processing part 122 of the management module 120. The retrieval processing part 122 of the management module 120 searches user management information 131 to select a target name corresponding to the received user name and password for iSCSI authentication, and sends the result to the target determination processing part 143 as a target name retrieval reply. The target determination processing part 143 sends the target name included in the received reply to the target protocol processing part 141 (step 172).

The target protocol processing part 141 sets the IP address (IP-NAa) of the node device 104, which is a target address corresponding to the selected target name, in the Send Targets reply packet, and sends the reply packet to the computer 101 (step 173).

Figure 7B:
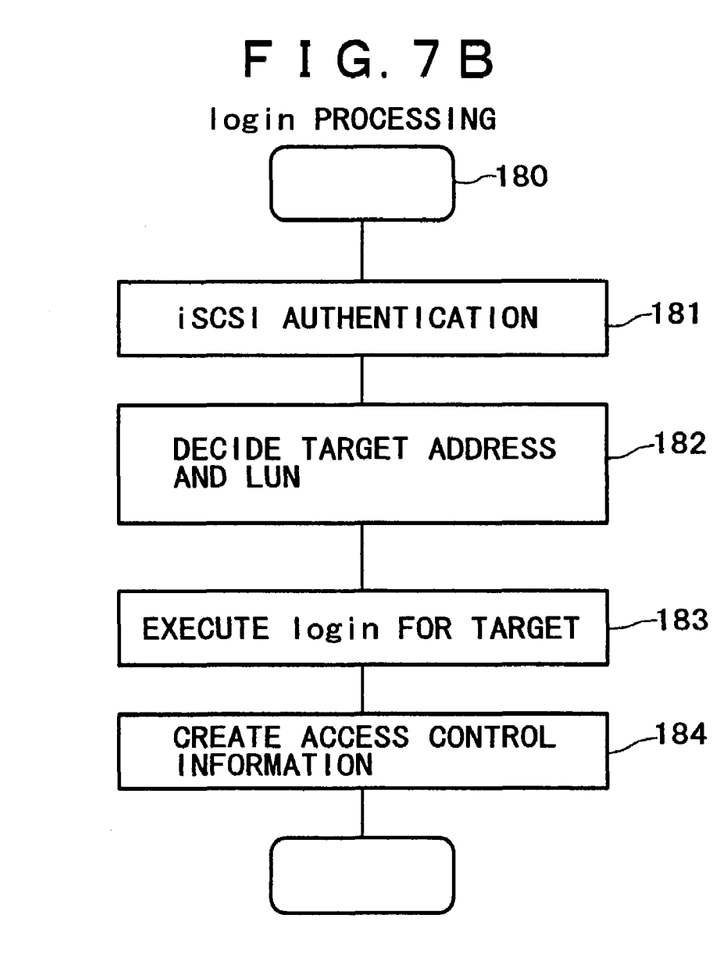
FIG. 7B is a flowchart showing the procedure for login processing of the relay module.

(7) Login Processing

FIG. 7B is a drawing showing a procedure example of the aforementioned login processing. The iSCSI driver of the computer 101 sends a session establishment request (hereinafter referred to as a login request packet) to the target address (the node device 104) specified in the Send Targets reply packet. The node device 104 used in the Send Target processing and the node device 104 used in the login processing may be different.

The login request packet includes a user name and password for iSCSI authentication that correspond to the user name, and the iSCSI target name specified in the Send Targets reply packet. The target protocol processing part 141 of the node device 104 that has received the login request packet performs login processing.

The target protocol processing part 141 performs the same iSCSI authentication processing as that in the step 171 of the Send Targets processing. For access disapproval, the target protocol processing part 141 sets an access disapproval error in the login reply packet and sends it to the computer 101 (step 181).

For access approval, the target protocol processing part 141 selects a user-usable target address and LUN of the storage device 102 by calling the target determination processing part 143. Specifically, the target determination processing part 143 sends a target address retrieval request including the received user name and password for iSCSI authentication to the retrieval processing part 122 of the management module 120.

The retrieval processing part 122 of the management module 120 compares the received user name and password for iSCSI authentication and the iSCSI target name with the information registered in the user management information 131 and the target management information 132, and selects a target address and LUN corresponding to the received user name and password for iSCSI authentication. The retrieval processing part 122 sends the selected target address and LUN to the target determination processing part 143 as a target address retrieval reply. The target determination processing part 143 sends the target address and LUN to the target protocol processing part 141 (step 182).

The target protocol processing part 141 calls the initiator protocol processing part 145 and lets the initiator protocol processing part 145 perform login processing by use of the received target address and LUN. The initiator protocol processing part 145 creates a login request packet for the storage device 102. The login request packet includes the iSCSI target name sent from the computer 101, and the user name and password for iSCSI authentication registered in (b) of (1). The initiator protocol processing part 145 sends the created login request packet to the storage device 102 having the target address acquired in step 182, and performs login.

When the storage device 102 having received the login request packet performs iSCSI authentication, it uses any of the user name and password for iSCSI authentication and the IP address IP-NAb of the node device 104 that are included in the packet, to perform the same iSCSI authentication as that in step 171 mentioned above. The storage device 102 having performed the iSCSI authentication sets information indicating whether the node device 104 is approved for access in the login reply packet, and sends the reply packet to the initiator protocol processing part 145 of the node device 104. The initiator protocol processing part 145 of the node device 104 passes the access approval/disapproval information set in the login reply packet to the target protocol processing part 141.

For access disapproval, the target protocol processing part 141 sets an access disapproval error in the login reply packet and passes it to the computer 101 (step 183).

For access approval, the target protocol processing part 141 creates access control information 160. The target protocol processing part 141 sets in the access control information 160, information (hereinafter referred to as session identification information) identifying the session between the computer 101 and the node device 104, the session identification information between the node device 104 and the storage device 102, information associating these pieces of session identification information, the user name and password for iSCSI authentication of the user, the target name and target address of the storage device 102 used by the user, and information indicating LUN used by the user (step 184).

Next, the target protocol processing part 141 creates a login reply packet indicating login success and sends it to the computer 101. This terminates the login processing.

(8) Logical Unit Configuration Acquisition Processing

After the termination of the login processing, in other words, the receipt of the login reply packet indicating login success, the iSCSI driver of the computer 101 uses the session established in the login processing, and issues an SCSI command request to acquire LUN and LU use approval/disapproval information. This command is sent to the target protocol processing part 141 of the node device 104 through the IP network 103.

The target protocol processing part 141 of the node device 104 acquires the session identification information between the node device 104 and the storage device 102 that corresponds to the session, from the access control information 160. The target protocol processing part 141 calls the initiator protocol processing part 145, with the session identification information as an argument, to execute the transmission of the SCSI command for acquiring LUN and LU use approval/disapproval information.

The initiator protocol processing part 145 uses the session specified in the session identification information to pass the SCSI command request received from the computer 101 to the storage device 102.

Upon receiving the SCSI command request through the IP network 105, the storage device 102 sets LUN usable to the session and LU use approval/disapproval information in the SCSI command reply, and passes it to the initiator protocol processing part 145 of the node device 104.

The initiator protocol processing part 145 of the node device 104 uses the access control information 160 to determine whether the LU assigned to the user using the session is included in the received SCSI command reply. If included, the initiator protocol processing part 145 passes only the LUN and LU use approval/disapproval information of LU assigned to the user to the target protocol processing part 141. The target protocol processing part 141 sets only the received LUN and LUN use approval/disapproval information in the SCSI command reply and passes it to the computer 101.

If not included, the initiator protocol processing part 145 notifies the target protocol processing part 141 that there is no usable LUN. The target protocol processing part 141 sends the SCSI command reply to the computer 101 without setting LUN and LUN use approval/disapproval information.

The iSCSI driver of the computer 101, only when LUN and LUN use approval/disapproval information are set in the SCSI command reply, registers the received LU in the device file of the computer 101 as an SCSI device.

(9) Data Read/Write Processing

After the termination of processing (5) to (8) above, the user mounts the SCSI device in the file system of the computer 101. After that, when the SCSI device is used in the computer 101, the iSCSI driver uses the session established between the computer 101 and the node device 104 to send and receive SCSI commands to and from the node device 104.

Upon receiving an SCSI command, the target protocol processing part 141 of the node device 104 acquires session identification information between the node device 104 and the storage device 102 that corresponds to the session, from the access control information 160. The target protocol processing part 141 calls the initiator protocol processing part 145, with the session identification information as an argument. The initiator protocol processing part 145 uses the session specified in the session identification information to send and receive SCSI commands.

(10) Session Termination Processing

When the user removes the SCSI device from the computer 101, that is, when the user dismounts the SCSI device from the file system, the iSCSI driver of the computer 101 sends an iSCSI request packet for terminating the session to the node device 104. The target protocol processing part 141 of the node device 104 acquires the session identification information between the node device 104 and the storage device 102 that corresponds to the session to be terminated, from access control information 160.

The initiator protocol processing part 146 uses the session between the node device 104 and the storage device 102 specified in the session identification information to send an iSCSI request packet for requesting session disconnection to the storage device 102. The initiator protocol processing part 145, from the access control information 160, deletes the session identification information between the node device 104 and the storage device 102 corresponding to the session requested for session disconnection, session identification information between the node device 104 and the storage device 102, and information relating to the pair of the information items.

By the above processing, in the computer 101, only the LU the user using the computer 101 is permitted to use can be used. Logical units assigned to other users cannot be accessed from the computer 101 being used by the user because the computer 101 is not notified of the logical units.

Although the node device 104 is single in the above description, a plurality of node devices 104 may exist. In the present embodiment, a central management server 106 described in a second embodiment may be provided. In this case, when the relay module 140 of the node device 104 uses the registration module 170 and the management module 120 of the central management server 106, the node device 104 and the central management server 106 perform the sending and receiving of packets through the IP network 105.

Next, a second embodiment will be described with reference to FIGS. 8 to 10.

Figure 8:
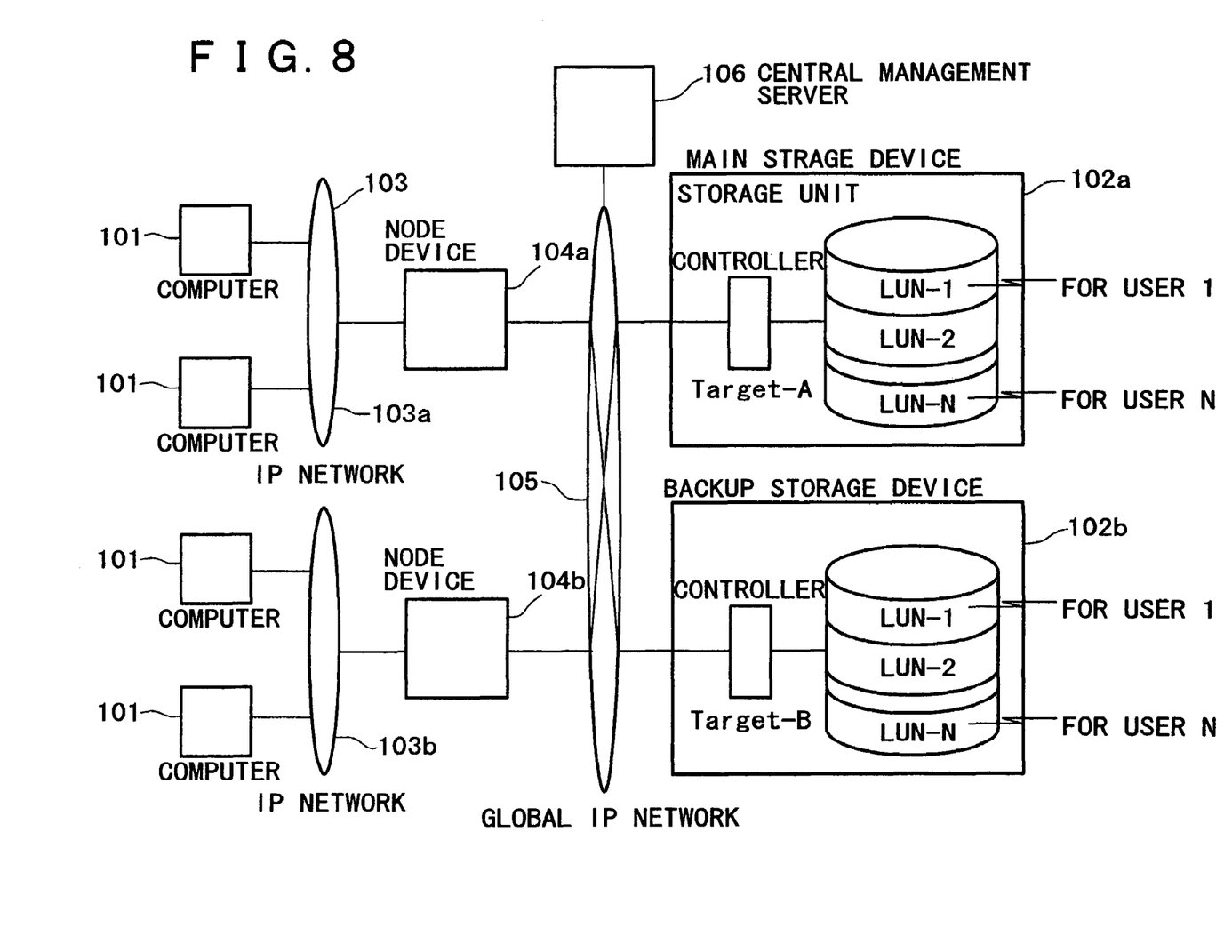
FIG. 8 is a drawing showing a sample configuration of a system in a second embodiment.

FIG. 8 is a drawing showing a sample configuration of a computer system to which the second embodiment is applied.

In the present embodiment, a data center performs the service (hereinafter referred to as remote backup service) of reproducing data stored in a storage device 102 in a remote storage device 102. A storage device 102 mainly used is referred to as a main storage device 102a, and a storage device 102 storing the reproduction of data stored in the main storage device 102a is referred to as a backup storage device 102b. The storage devices 102 are in different data centers. Like the first embodiment, a plurality of users have individually usable logical units in the main storage device 102a and the backup storage device 102b.

Furthermore, in the present embodiment, only the relay module 140 is installed in the node device 104. A computer (hereinafter referred to as a central management server) 106, connected to the IP network 105, which has the registration module 170 and the management module 120, is provided. The central management server 106 manages the operating status of the main storage device 102a and the backup storage device 102b such as which of them is operating (in service).

Figure 10:
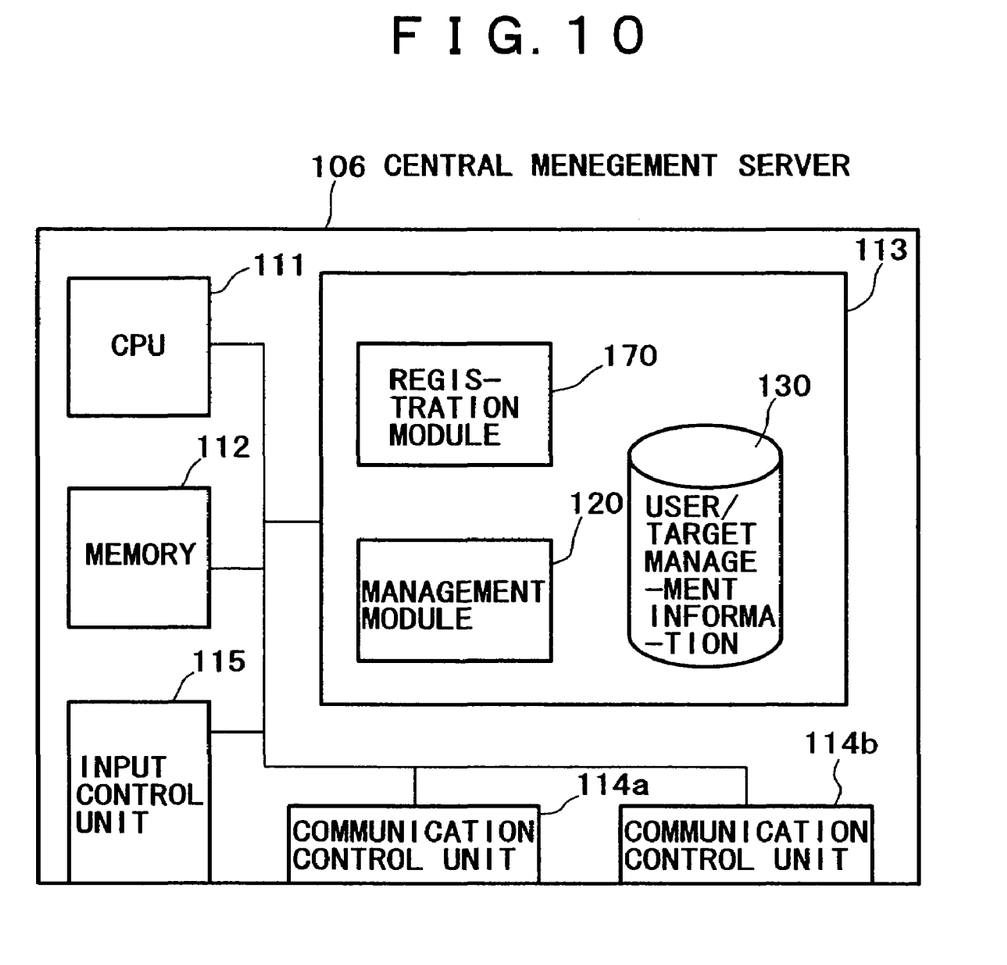
FIG. 10 is a drawing showing a sample configuration of a central management server 105.

FIG. 10 is a drawing showing an example of the apparatus configuration of the central management server 106. Like the node device 104, the central management server 106 is a computer that includes a CPU 111, a main memory 112, a storage unit 113, a communication control unit 114, an input control unit 115, and the like. The communication control unit 114 is connected with the IP network 105.

The storage unit 113 of the central management server 106 stores a registration module 170, a management module 120, and user/target management information 130. The registration module 170 and the management module 120 are the programs that are read into the main memory 112 and executed by the CPU 111, whereby the management of the node devices 104 is performed. The registration module 170 and the management module 120 may be realized by dedicated hardware, not by programs.

The central management server 106 uses the TCP/IP network communication interface and the communication control unit 114 that are offered by the OS, to perform communication with other computers and other apparatuses.

The present embodiment is different from the first embodiment in the configuration of the user/target management information 130.

Figure 9:
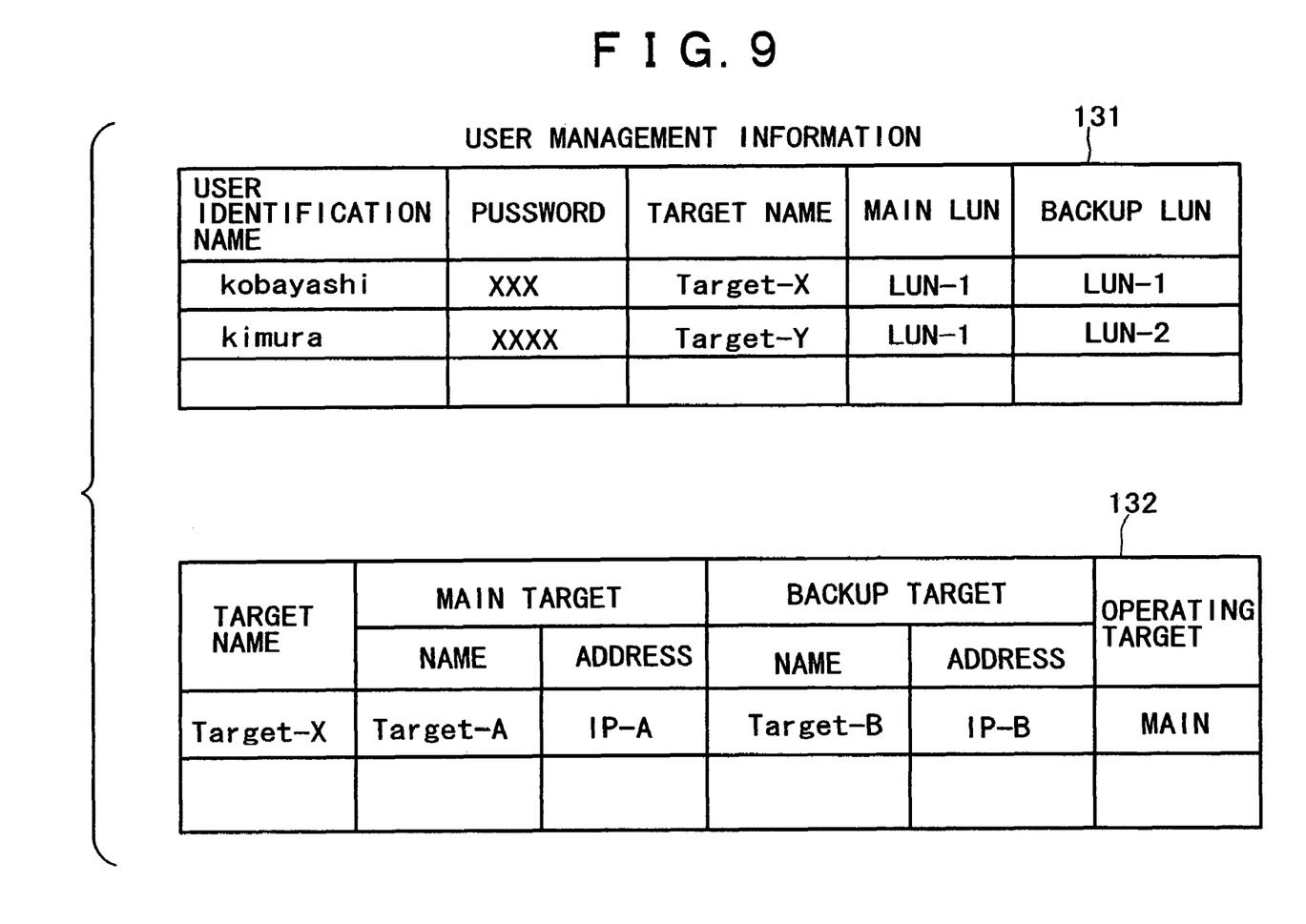
FIG. 9 is a drawing showing a sample configuration of user/target management information in the second embodiment.

FIG. 9 is a drawing showing a sample configuration of the user/target management information 130 in the present embodiment.

The user management information 131 in the present embodiment contains, in addition to the information of the user management information 131 described in the first embodiment, newly added information indicating LUNs of the main storage device 102a and LUNs of the backup storage device 102b.

The target management information 132 of the present embodiment contains, in addition to the target management information 132 described in the first embodiment, main storage device information (target names and addresses indicating the main storage device 102a), backup storage device information (target names and addresses indicating the backup storage device 102b), operating storage information (information indicating which of the main storage device 102a and the backup storage device 102b is operating). The target names of the target management information 132 and the target names of the user management information 131 are associated with pairs of main target names indicating the main storage device 102a and backup target names indicating the backup storage device 102b. The association information is created at the time of the registration of the target management information 132.

Hereinafter, the procedure for using the computer system of the present embodiment will be described in order along with the individual operations of the apparatuses.

First, a description is made of an advance preparation procedure (steps (0), (1), (2) below) which the system administrator performs. The steps (1) and (2) below may be performed in any order.

In the present embodiment, before performing the step "(1) Starting the node device 104", the step "(0) Setting of the central management server 106" is performed.

(0) Setting of the Central Management Server 106

The system administrator performs processing of (a) and (b) below through a console of the central management server 106.

(a) An IP address (IP-M) is assigned to the communication control unit 114 of the central management server 106 and registered according to the specifications of the OS.

(b) The communication port (Port-M) and the IP address (IP-M) that are used by the request accept processing part 124 are used as parameters to start the management module 120. After the start, the management module 120 reads the user/target management information 130 and initializes the data. The request accept processing part 124 opens the communication port Port-M, and makes preparations for receiving update, retrieval, and authentication requests.

(1) Starting the Node Device 104

The system administrator performs processing of (a), (b), (d) of the first embodiment from the console of the node device 104.

(2) Starting the Storage Device 102 and Creating a Logical Unit

The same processing as that in (2) of the first embodiment is performed.

(3) User Registration

The system administrator performs the same processing as that in the first embodiment through the console of the central management server 106. Information registered in the management module 130 from the registration module 170 is user identification names and passwords, main target names indicating the main storage device 102a used by the user, backup target names indicating the backup storage device 102b, target names associated with pairs of the main target names and backup target names, LUNs of the main targets, LUNs of the backup targets, main target addresses, backup target addresses, and the storage devices 102 to be operated.

At any time when the storage device 102 to be operated is changed, the system administrator starts the registration module 170 from the console of the central management server 106 and updates the operating target information of the target management information 132. In other words, information indicating which of a main target and a backup target is operating is registered.

(4) Setting of the Computer 101

The same processing as that in the first embodiment is performed. In the present embodiment, since two node devices 104 exist, the IP address of the node device 104a for the computer 101 connected to the IP network 103a, and the IP address of the node device 104b for the computer 101 connected to the IP network 103b are set in the initialization file of the iSCSI driver.

(5) Start Processing

The same processing as that in the first embodiment is performed.

(6) Send Targets Processing

The same processing as that in the first embodiment is performed.

(7) Login Processing

The same processing as that in the first embodiment is performed. However, step 182 is performed as follows.

The target protocol processing part 141 selects a user-usable target address and LUN of the storage device 102 by calling the target determination processing part 143. The target determination processing part 143 sends a target address retrieval request containing a user name and a password for iSCSI authentication to the retrieval processing part 122 of the management module 120 of the central management server 106 through the network 105. The retrieval processing part 122 of the management module 120 compares the received user name and password for iSCSI authentication and iSCSI target name with the user management information 131 and the target management information 132.

The retrieval processing part 122 obtains the main target information, backup target information, and operating target information that correspond to the received user name and password for iSCSI authentication and iSCSI target name, from the target management information 132. The retrieval processing part 122 selects the target name, target address, and LUN of the operating target from the operating target information, and sends them as a target address retrieval reply to the target determination processing part 143 of the node device 104 through the network 105.

The target determination processing part 143 passes the target address and LUN to the target protocol processing part 141.

(8), (9), (10)

The same processing as that in the first embodiment is performed.

Furthermore, if the main storage device 102*a* stops and is switched to the backup storage device 102*b*, the session established among the computer 101, the node device 104, and the main storage device 102*a* is temporarily disconnected. However, if a session establishment request (login request) is issued to the node device 104 again from the computer 101, the node device 104 can establish a session with the backup storage device 102*b* when the operating target information of the central management server 106 is updated.

In the first embodiment, the central management server 106 may be provided. Also in this case, when the relay module 140 of the node device 104 uses the registration module 170 and the management module 120, the node device 104 and the central management server 106 perform the sending and receiving of packets through the IP network 105.

The present invention also allows configuration described below. The computer system includes: means for centrally managing user identification names and passwords assigned to users, and the target names, addresses, and logical units of storage devices; means for acquiring the target names and logical unit names of the storage devices from the user identification names and passwords; and means for acquiring the addresses of the storage devices from the user identification names, passwords, and target names.

The computer system includes, to perform iSCSI session establishment processing: means for creating access control information of a logical unit for each session; and means, during session establishment, for performing access control of a logical unit on the basis of created access control information.

The computer system includes a central management server for centrally managing user identification names, passwords, and the target names, addresses, and logical units of storage devices, and a node device having an iSCSI initiator function and an iSCSI target function. The computer system includes: means for deciding the storage device and address to be connected through use of the central management server by the node device; means for creating access control information of a logical unit during session establishment processing; and means for performing access control of logical units.

According to the preferred embodiments of the present invention, users can use storage devices or logical units of the storage devices that are approved for the users through any computers or any networks even via node devices such as cache devices and gateway devices.

Switching can be automatically made among a plurality of storage devices used for service.

Furthermore, the present invention can flexibly provide for changes in the number of users of storage devices, the number of storage devices in the system, and the number of node devices. The storage devices are also released from the management of the access control information of individual users, with the result that the management of the access control information is eased.

What is claimed is:

1. A method of communicating information using a node device that connects user-operated computers and storage devices to be accessed through a network to use the storage devices, the node device comprising:
    a first storage part that registers iSCSI management information including iSCSI initiator names, and user names and passwords for iSCSI authentication as user identification information that are presented to the node device;
    a second storage part that registers user management information indicating a correspondence relationship among user names, passwords, iSCSI target names of storage devices assigned to the users, and the storage areas assigned to the users, and target management information indicating a correspondence relationship between iSCSI target names and target addresses of the storage devices;
    a relay module that relays SCSI commands sent from the computers; and
    an authentication processing part that authenticates users by receiving user identification information sent from the computers and referring to the first storage part in relation to the identification information,
    wherein the method comprises the steps of:
    receiving identification information for specifying a user from the computer through a network;
    referring to the second storage part using the identification information as a key, and thereby obtaining from the second storage part, an iSCSI target name of a storage device having a storage area assigned to the user;
    sending the iSCSI target name of the storage device to the computer;
    establishing a session between the node device and the computer;
    establishing a session between the node device and the storage device used by the user;
    sending SCSI commands from the computer to the storage device through the node device; and
    sending information about the storage area assigned to the user to the computer from the storage device through the node device.

* * * * *